United States Patent
Webb

(10) Patent No.: US 7,281,513 B1
(45) Date of Patent: Oct. 16, 2007

(54) INVERTED WANKEL

(76) Inventor: David W. Webb, 412 S. River St., Newberg, OR (US) 97132

(*) Notice: Subject to any disclaimer, the term of this patent is extended or adjusted under 35 U.S.C. 154(b) by 44 days.

(21) Appl. No.: 11/361,235

(22) Filed: Feb. 24, 2006

(51) Int. Cl.
*F02B 53/00* (2006.01)
*F02B 53/12* (2006.01)

(52) U.S. Cl. .................. 123/200; 123/210; 123/211; 418/61.2

(58) Field of Classification Search ................ 123/200, 123/210, 211, 218, 228, 229; 418/61.2, 34
See application file for complete search history.

(56) References Cited

U.S. PATENT DOCUMENTS

| | | | |
|---|---|---|---|
| 2,162,771 A | 6/1939 | Winans | |
| 2,988,065 A * | 6/1961 | Wankel et al. | 418/61.2 |
| 3,062,435 A | 11/1962 | Bentele | |
| 3,102,520 A | 9/1963 | Schlor | |
| 3,113,526 A | 12/1963 | Paschke | |
| 3,213,714 A | 10/1965 | Hejj et al. | |
| 3,253,580 A | 5/1966 | Eberhard et al. | |
| 3,310,042 A * | 3/1967 | Haas | 123/205 |
| 3,744,941 A * | 7/1973 | Nestor | 418/61.2 |
| 3,762,377 A * | 10/1973 | Anthony et al. | 123/211 |
| 3,941,098 A | 3/1976 | Roberts | |
| 3,952,708 A * | 4/1976 | Burley | 123/211 |
| 3,987,758 A * | 10/1976 | Wankel | 123/210 |
| 4,015,441 A * | 4/1977 | Robinet | 62/402 |
| 4,095,564 A * | 6/1978 | Hochstein | 123/211 |
| 4,455,128 A | 6/1984 | Seybold | |
| 4,481,920 A | 11/1984 | Carr et al. | |
| 4,590,761 A | 5/1986 | Zettner | |
| 4,612,886 A | 9/1986 | Hansen et al. | |
| 4,714,417 A | 12/1987 | Wankel | |
| 5,375,985 A * | 12/1994 | Pipaloff | 418/6 |
| 5,855,474 A * | 1/1999 | Shouman | 418/6 |

FOREIGN PATENT DOCUMENTS

| | | | |
|---|---|---|---|
| JP | 63106333 A | * | 5/1988 |
| JP | 63192901 A | * | 8/1988 |

* cited by examiner

*Primary Examiner*—Thomas Denion
*Assistant Examiner*—Mary A Davis
(74) *Attorney, Agent, or Firm*—Timothy E. Siegel; Law Office of Timothy E. Siegel

(57) ABSTRACT

An internal combustion engine comprising a support structure, including a tube and a hollow stator core, supported by and rigidly affixed to the tube. Additionally, a rotor assembly is eccentrically and rotatably mounted about the stator core and having a pair of partial sidewalls, each of which defines a circular opening. A pair of shaft seals, in which each shaft seal is set into one of the circular openings and are rotatably mounted about the tube. The stator core, rotor and shaft seals together define multiple, separate sealed chambers that change volume as the rotor moves. Finally, ignition, intake and exhaust mechanisms are mounted internal to the hollow stator core.

16 Claims, 8 Drawing Sheets

INVERTED WANKEL

BACKGROUND OF THE INVENTION

Students of engine design will be familiar with a standard Wankel rotary engine. In this type of engine, the rotor with its internal ring gear is driven eccentrically about a fixed pinion. The rotor has a "constant-width" geometry: it always appears to be the same width when viewed from any angle. The particular constant-width shape used in production rotary engines is based on a Reuleaux triangle, named for the French mathematician that formally described it.

The rotor revolves with a housing of epitrochoidal geometry, so that regions of gas in the engine housing may undergo compression and ignition as a result of the rotor motion.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first, separate aspect, the present invention may take the form of an internal combustion engine comprising a support structure, including a tube and a hollow stator core, supported by and rigidly affixed to the tube. Additionally, a rotor assembly is eccentrically and rotatably mounted about the stator core and having a pair of partial sidewalls, each of which defines a circular opening. A pair of shaft seals, each of which is set into one of the circular openings and is rotatably mounted about the tube. The stator core, rotor and shaft seals together define multiple, separate sealed chambers that change volume as the rotor moves. Finally, ignition, intake and exhaust mechanisms are mounted internal to the hollow stator core.

In a second separate aspect, the present invention may take the form of an internal combustion engine comprising support structure means, including tube means and stator core means, supported by and rigidly affixed to the tube means. Rotor means are eccentrically and rotatably mounted about the stator core means and have a pair of partial sidewall means, defining a circular opening. A pair of shaft seal means, each of which is set into one of the circular openings and are rotatably mounted about the tube means. The stator core means, rotor means and shaft seal means together defining multiple chambers that change volume as the rotor means moves, at least one of the chambers being a combustion chamber. Finally, ignition, intake and exhaust means are mounted internal to the hollow stator core means.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF THE PREFERRED EMBODIMENTS

Figure 2:
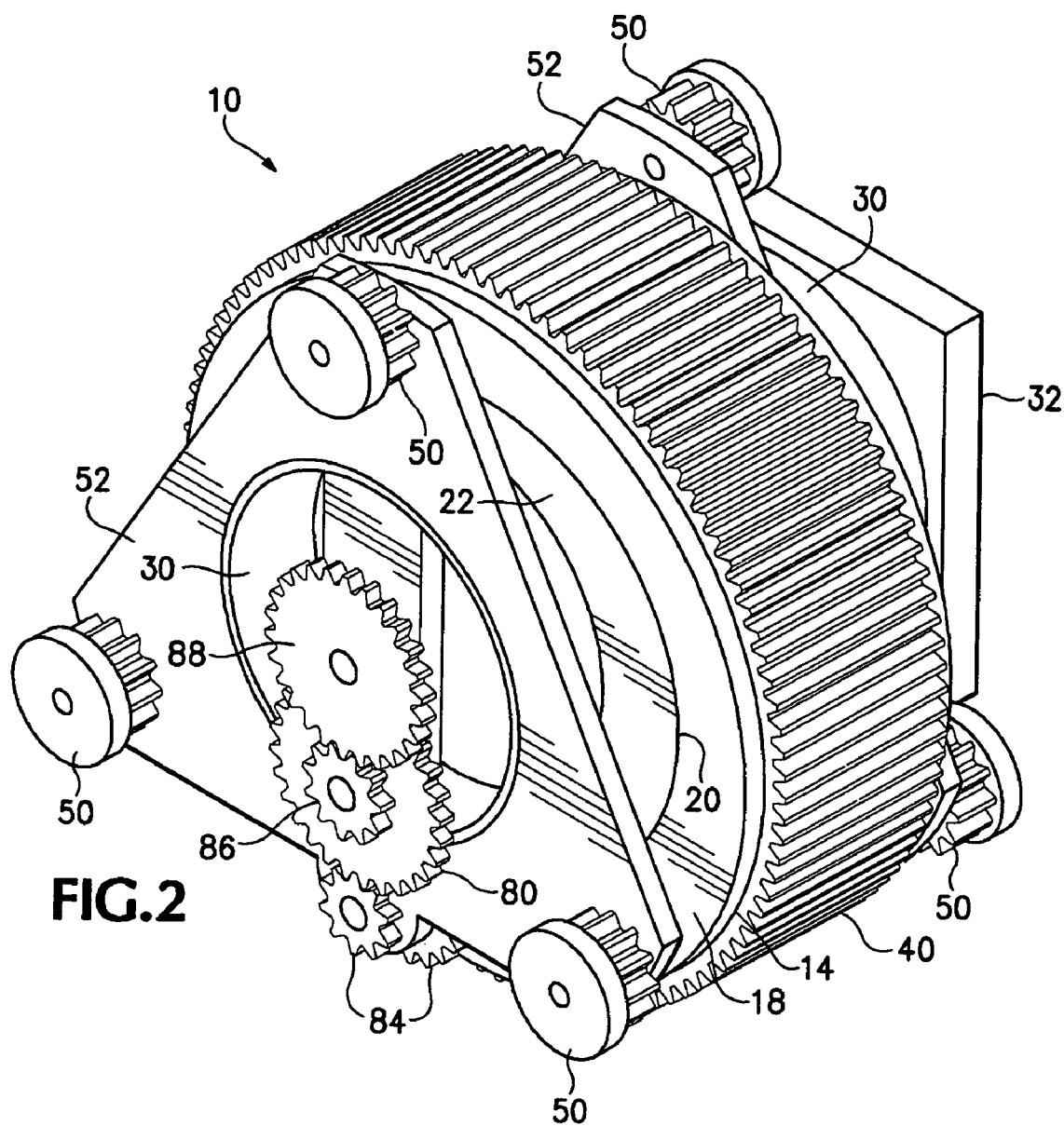
FIG. 2 is a side-top perspective view of the engine of FIG. 1, with the exterior power band removed.
Figure 4:
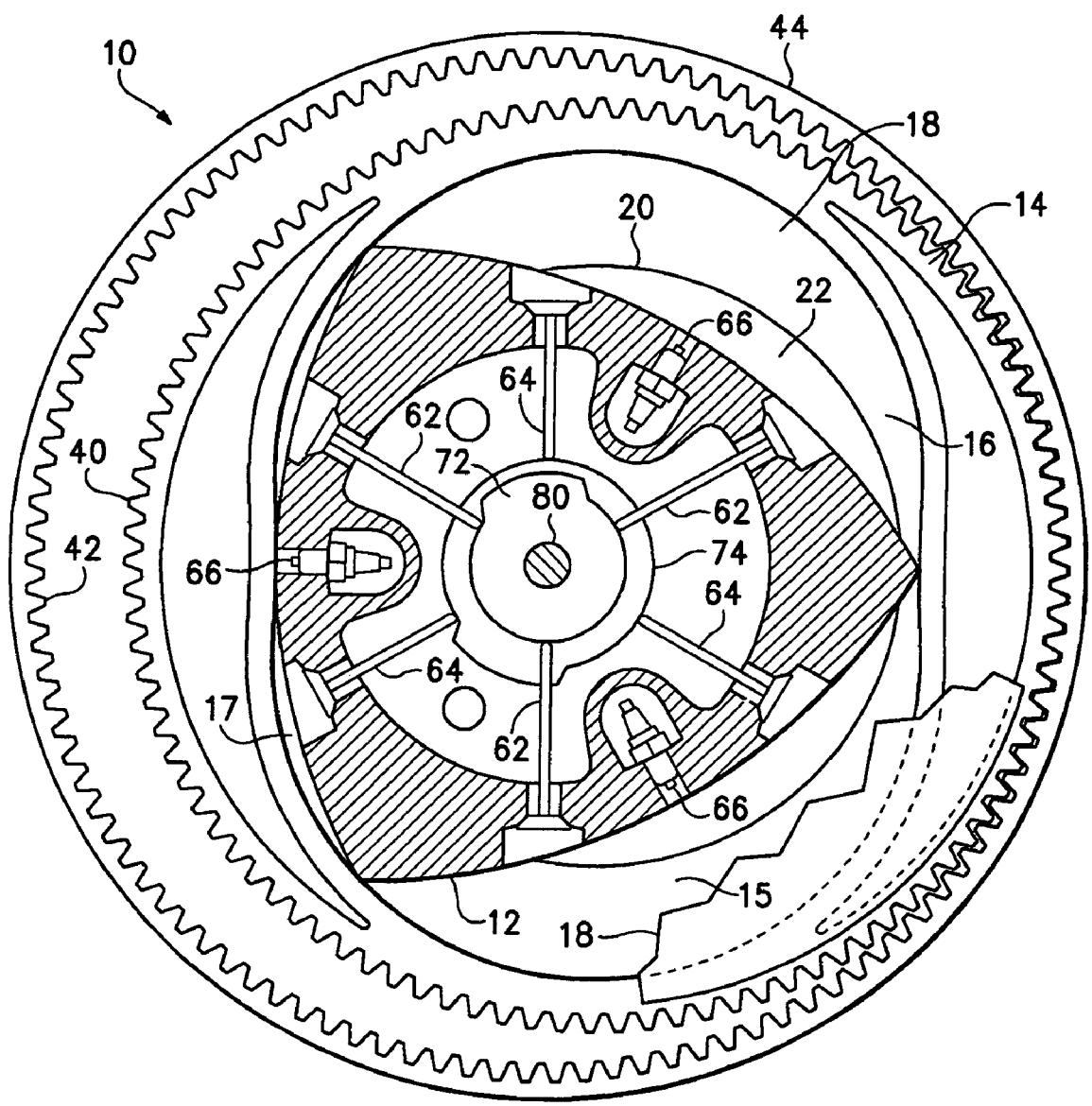
FIG. 4 is a side cut-away sectional view of the components of FIG. 3, taken along line 4-4 of FIG. 1.

Referring first to FIG. 4, in an inverted rotary engine 10 a constant width stator core 12 has the same shape and position as the rotor does in a standard rotary engine. Also, a rotor 14 has the same radially inwardly facing surface as does the exterior housing in a standard rotary engine. The rotor also includes a pair of partial sidewalls 18 that each define a circular opening 20. A circular shaft seal 22 is rotatably and sealingly mounted in each opening 20 and rotatably mounted about a support tube 30 (FIG. 2). The stator core 12, the rotor 14 and the pair of shaft seals 22 together define a set of three combustion chambers 15, 16 and 17.

Figure 1:
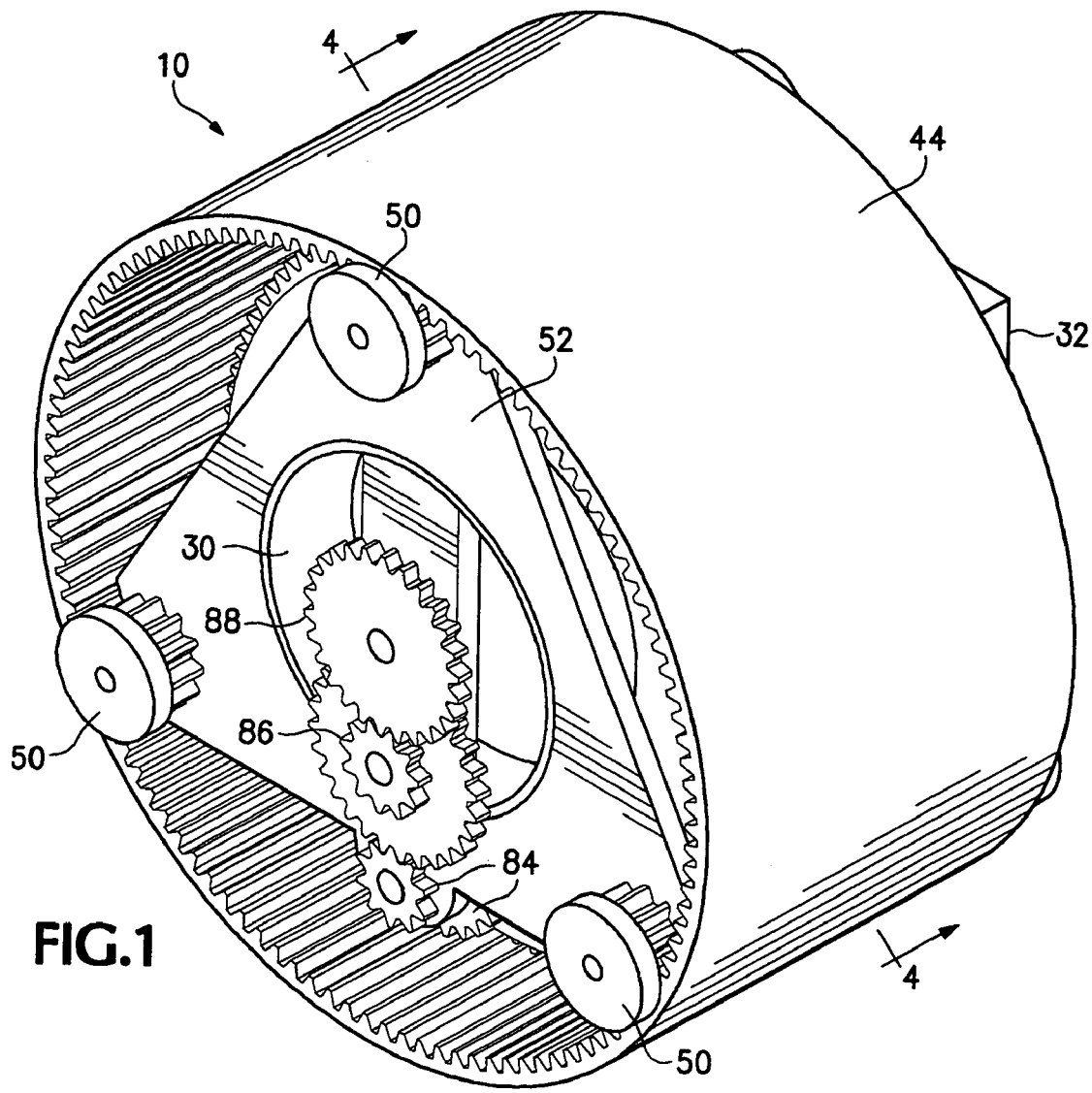
FIG. 1 is a side-top perspective view of an inverted rotary engine, according to the present invention.

The rotor 14 is driven about the stator 12 by a sequence of explosions that cause the rotor 14 to both translate and rotate. This series of translational and rotational movements moves the position of openings 20, thereby forcing the seals 22 to rotate in an eccentric path about the support tube 30, in a direction opposite to the rotational direction of the rotor 14 and at twice the rotational velocity. Because explosive compression occurs between the rotor 14 and the stator core 12, stator core 12 must be firmly anchored. Core 12 is rigidly supported on its interior by the core tube 30, which extends laterally to be firmly anchored in the engine mount 32 as seen in FIG. 1. The radially outer surface of rotor 14 defines a set of teeth 40, a portion of which are always engaged with a set of inwardly facing teeth 42 of a surrounding power band 44. Referring to FIG. 1, a set of pinions 50 all rotatably mounted on a triangular pinion support 52, constrains band 44, permitting it to revolve symmetrically about the center of core 12, more slowly but in the same direction as rotor 14. The pinions 50 are external to the rotor 14, but are still internal to the power band 44, leaving its outer circumference unencumbered and available to drive a circumferential load. In an alternative preferred embodiment, pinions 50 are laterally extended beyond the ends of the power band 44 to provide additional means of utilizing power from the engine. Pinion supports 52 are mounted onto tube 30.

Referring again to FIG. 4, to create and facilitate a driving series of combustions, a set of three intake ports 62, three exhaust ports 64 and three spark plugs 66, reside in the stator core 12. Elements 62 and 64 are controlled by cams 72 and 74 respectively. A similarly constructed spark plug cam (not shown), working on the same principles controls the timing of the spark plugs 66. A cam shaft 80 (FIG. 3) runs through the center of the core 12, and supports and drives cams 72, 74 and the spark plug cam.

Figure 3:
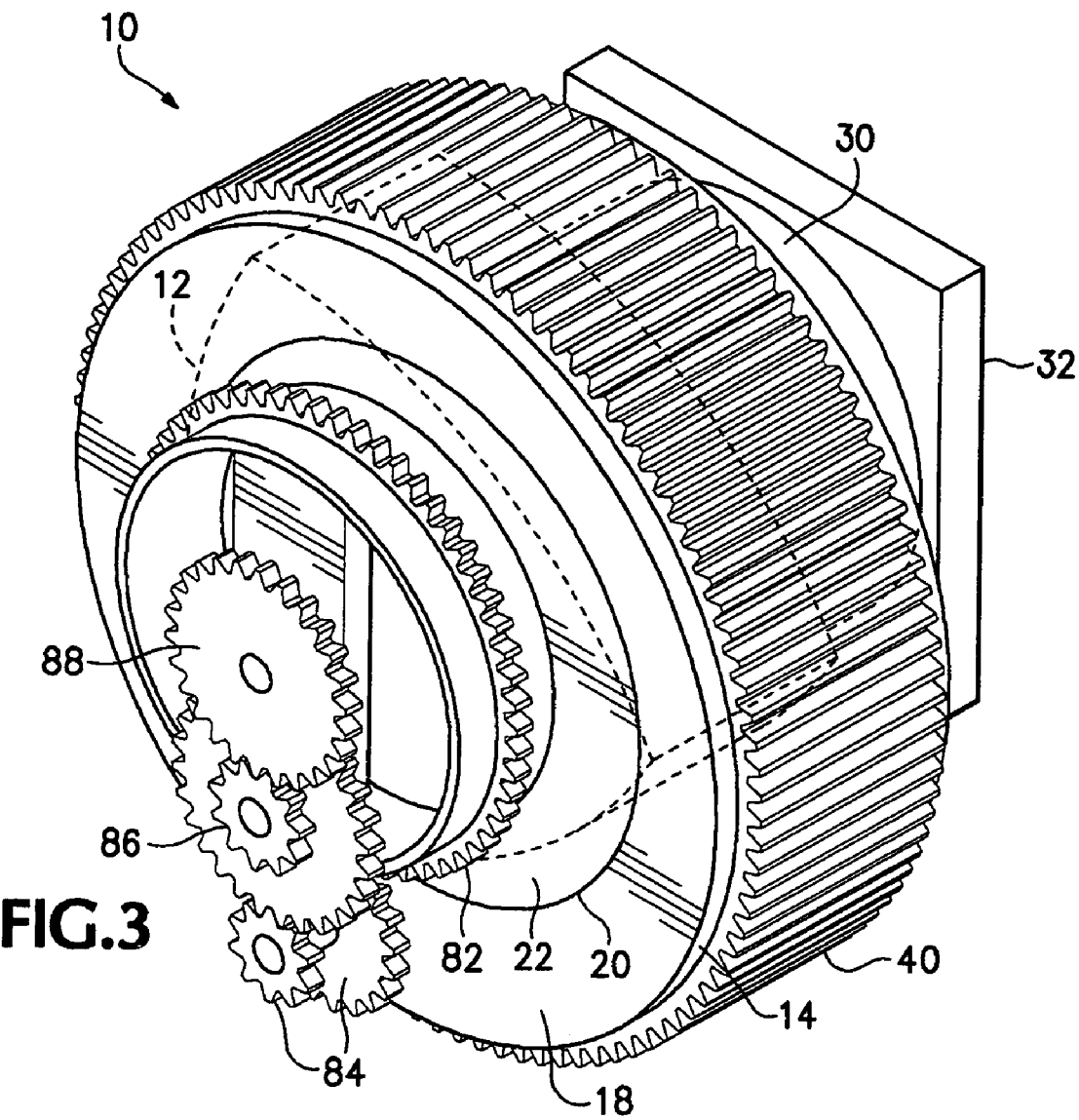
FIG. 3 is a side-top perspective view of the engine of FIG. 1, with the pinion mounts and pinions removed.

Referring now to FIG. 3, a cam shaft 80, to which cams 72, 74 and the spark plug cam are mounted is driven by a gear train that is driven by the motion of a set of teeth 82 on the exterior of shaft seal 22 and turns cam shaft 80 at the same rotational velocity as the rotor 14. More specifically a first step down gear 84 meshes with teeth 82 and drives a second step down gear 86, mounted on the laterally exterior side of rotor mount 52 (FIGS. 1 & 2). Gear 86, in turn, drives cog 88, to which shaft 80 is rigidly mounted. The gear ratios are listed in Table 1. The cam shaft 80 may be extended either direction beyond the end of the engine, perhaps for an application that needs to be synchronized with the rotor position, or simply as an additional means of harnessing the engine's power.

TABLE 1

| GEAR (NUMBER) | RADIUS | ANGULAR VELOCITY |
|---|---|---|
| Cam driver gear (82) | 6 | x |
| Inner cam transfer gear (84) | 2 | −3x |
| Outer cam transfer gear (84) | 1 | −3x |
| Inner cam stepdown gear (86) | 3 | x |
| Outer cam stepdown gear (86) | 1.333 . . . | x |
| Cam shaft gear (88) | 2.666 . . . | −x/2 |

Figure 5:
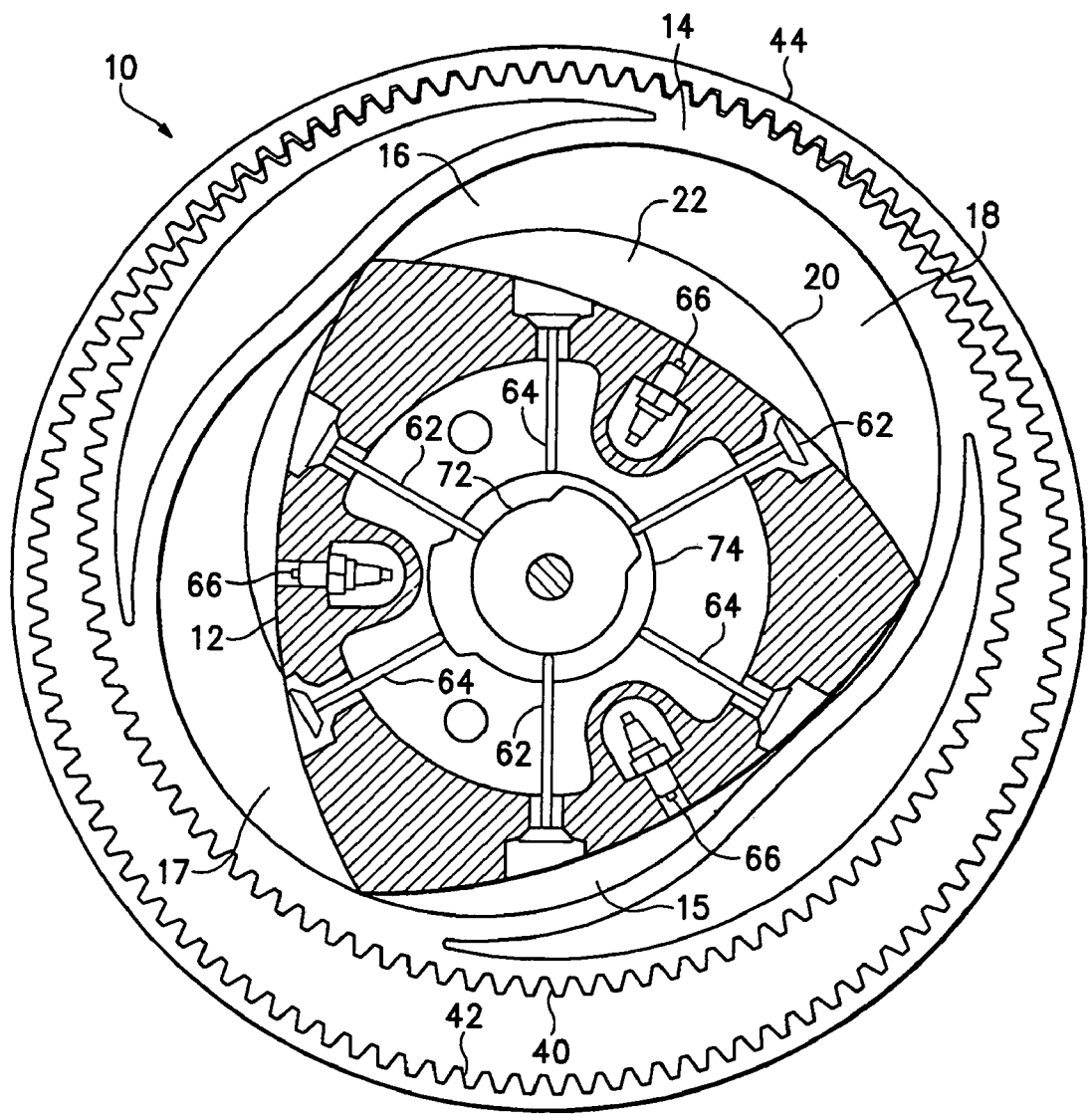
FIG. 5 is a side view of the components of FIG. 3, showing the rotor in a first position.
Figure 6:
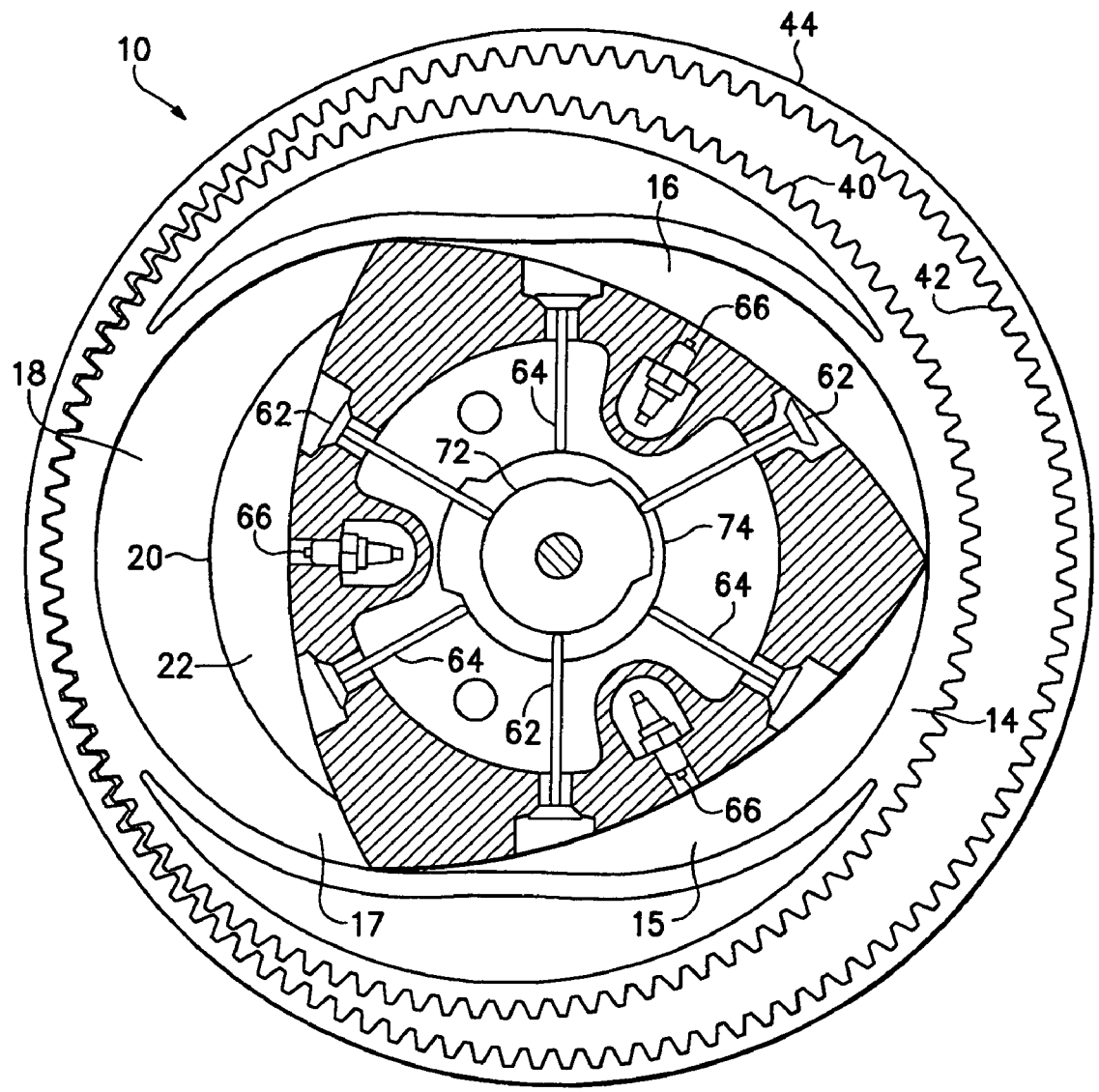
FIG. 6 is a side view of the components of FIG. 3, showing the rotor in a second position.

FIGS. 4, 5 and 6 show three instants in time of the operation of the engine 10. A first phase in the operation of engine 10 is shown in FIG. 4. FIG. 5 illustrates the major axis of the rotor having inclined by 45 degrees at which point a gasoline and air mixture in chamber 17 has been recently ignited by a sparkplug 66 of chamber 17. During this phase, also, chamber 16 is receiving a gasoline air mixture through an intake port 62 and chamber 17 is expelling exhaust through an exhaust port 64. Referring to FIG. 6, at a later instant the explosion of fuel in chamber 15 has forced rotor 14 to rotate clockwise and to translate downward. This action forces the shaft seal 22 to rotate counterclockwise as shown, driven by the partial sidewalls of rotor 14. The same operations are occurring in each of the chambers 15, 16 and 17 in FIG. 6 as in FIG. 5, but they are offset from each other in phase by 120 degrees.

Figure 7:
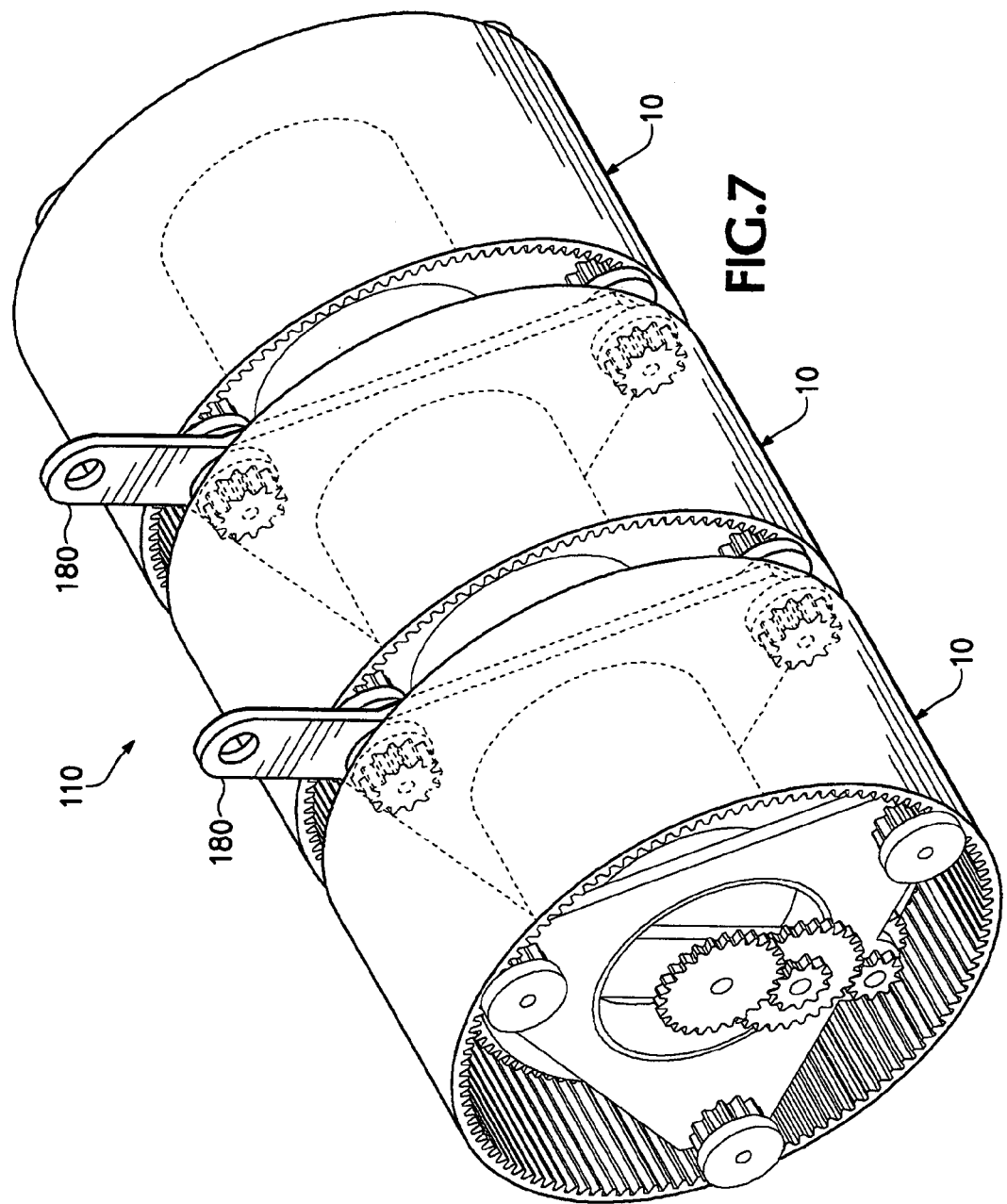
FIG. 7 is a perspective view of an alternative preferred embodiment, in which three of the engines of FIG. 1 are teamed together.

FIG. 7 shows a version in which three engines 10 are joined together to form a multirotor engine 110. All of the parts are essentially the same as for FIGS. 1-6. One difference, however, is that mounting block 32 has been removed in favor of radial engine mounts 180.

Engine 10 or 110 can also be used to drive a propeller set. This could be useful in an airplane or boat.

Figure 8:
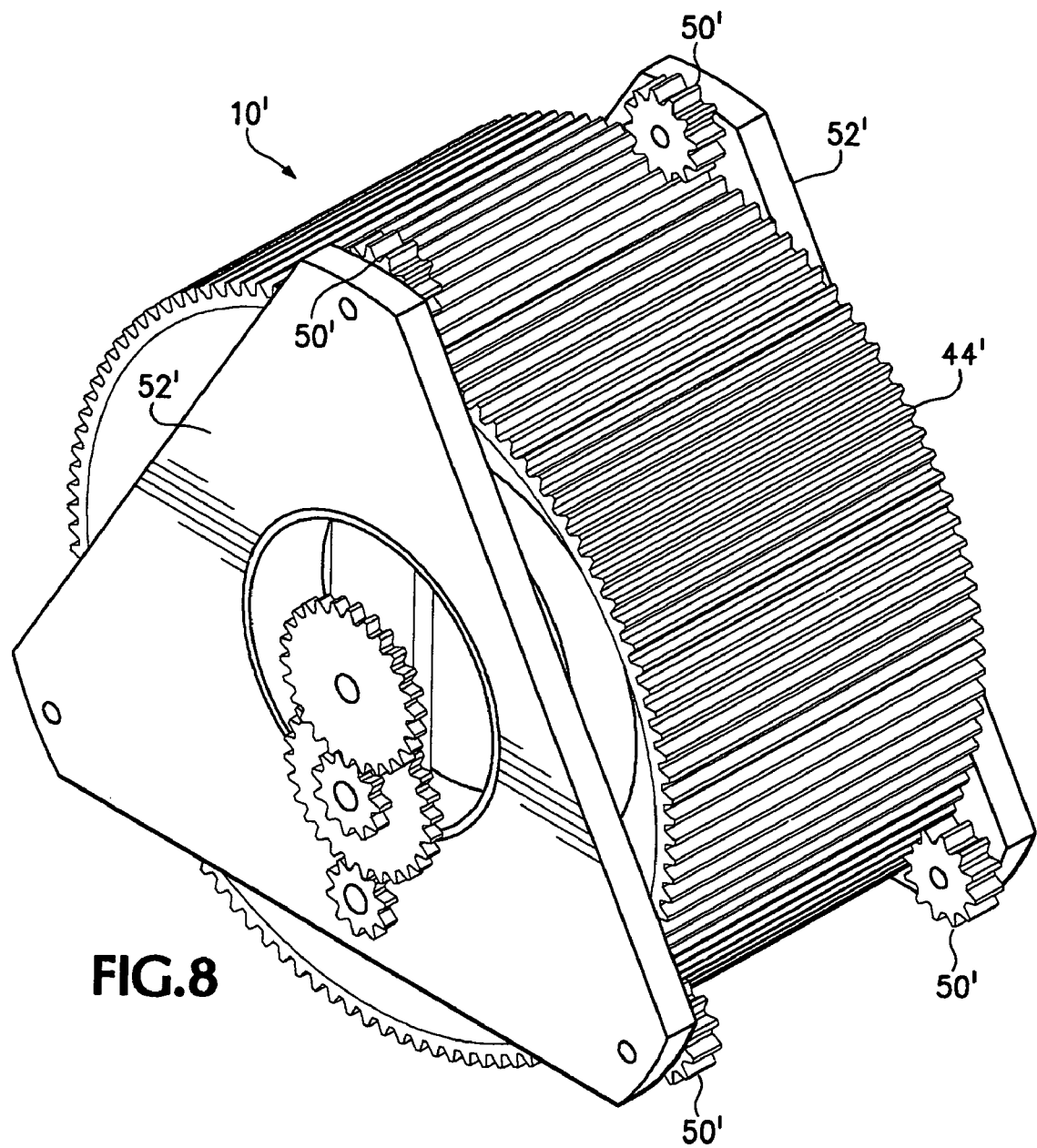
FIG. 8 is a perspective view of an embodiment preferred for use as the core of a planetary gear arrangement.

FIG. 8 shows an engine embodiment 10' in which the constraining pinions 50' are external to the power band 44' as they are mounted on a larger pinion support 52'. This is useful as the core of a planetary-gear transmission.

Theory of Operation

The operation of a rotary internal combustion engine depends on maintaining specific proportions between an internal rotor (or stator) of constant-width geometry and an enclosing hollow rotor having an internal surface of epitrochoid shape. The simplest constant-width object to produce is a "Reuleaux triangle". The inner surface of the surrounding rotor should define one fewer lobes than the number of "sides" in the constant-width stator. The epitrochoid shape is created by rolling a circle of radius RR around a stationary circle of RS and tracing the path of a follower point that is RF from the center of the rolling circle.

Let LT be the length of a side of the equilateral triangle about which the Reuleaux triangle is constructed. The constant-width shape is constructed by swinging an arc of radius LT from each vertex to connect the endpoints of the side opposite the vertex, and the apparent constant width of the shape is LT. The amount of eccentricity required by the center of this shape to sustain the appearance of constant width is denoted by E, where $$E = \text{Circumscribing Radius}(LT) - (LT/2)$$

The "Circumscribing Radius" function is the radius of a circle circumscribing the triangle, so $$E = LT/(2\sin(pi/3)) - (LT/2)$$

To allow a constant-width shape to pass between the two lobes of the epitrochoid, the values of RS, RR and RF must meet the restriction:

$$LT = 2*(RS + RR - RF) = L\text{MINOR},$$

the minor axis length of the epitrochoid. Because a two-lobe epitrochoid is being generated, there is also the restriction that:

$$RR = RS/2$$

This causes us (after some substitution) to choose:

$$RF = E,$$

$$RS = \text{Circumscribing Radius}(LT)/1.5, \text{ and}$$

$$RR = RS/2$$

and the value of RR follows from the restriction given above. The length of the major axis of the epitrochoid is then:

$$L\text{MAJOR} = 2*(RS + RR + RF).$$

It is necessary to adhere to these between the constant-width internal rotor (or stator) and its surrounding epitrochoidal chamber proportions in order to have compression. The inside dimensions of the epitrochoid are given above; to draw a larger epitrochoid around this (representing the outside of the combustion chamber wall), the static and rolling circle radii may be increased arbitrarily (maintaining the restriction that RR=RS/2), but the follower radius remains the same as that used for the inner epitrochoid above.

In the classical textbook Wankel engine, the radius of the ring gear through the rotor is 3E and the radius of the fixed pinion about which the ring gear is driven is 2E. Note that the radii of these two constraining gears differ by E. The constraining mechanism in an inverted engine has the combustion chamber encircled by an eccentric gear of radius RE, which in turn revolves within the constraining "power band" of radius RP. These gears have the same relationship as the pinion and the ring gear in the classical rotary engine in that they differ in radius by the degree of eccentricity:

$$RP = RE + E$$

The theoretical minimum eccentric gear radius is (LMAJOR/2), but it must be increased by the wall thickness of the combustion chamber and of the eccentric gear itself. The problem with increasing the radius of the eccentric gear arbitrarily is that the ratio of the radius of the eccentric gear to that of the power band is:

$$RE/RP = RE/(RE + E),$$

which tends toward 1 as RE tends toward infinity. Eventually (when the length of the gear teeth approaches E), the teeth will remain partially meshed about the circumference of the gear, and eccentric motion will no longer be possible. For this reason, increasing the radius of the eccentric gear arbitrarily should be avoided.

For the purpose of being able to assemble the engine, the rotating epitrochoidal combustion chamber must be subdivided into at least two parts that are assembled about the constant-width stator core. Because the stator core will fit through the narrowest dimension of the epitrochoid (LMINOR) at any orientation, it is attractive to split the combustion chamber across its minor axis, so that the bolts needed to seal the two halves of the chamber may reside in the "unused" space between the outside of the epitrochoid chamber and the inside of the encompassing eccentric gear. The remainder of this space could be filled with dead weight if the designer wants to simulate the effect of having the mass of the crankcase (on a conventional engine) added to the mass of the flywheel. This would produce an engine that is good for maintaining constant velocity, but would not accelerate quickly. Alternatively, this space may be used for blades to promote convective cooling of the engine. As long as RE is increased beyond LMAJOR as little as necessary, it is the inventor's intention that blades placed in this unused space be used only for engine cooling and not for turbine assistance of the engine.

The external pinions shown in the illustrations of the inverted engine are one embodiment of a constraint mechanism that forces the revolving power band to remain coaxial with the center of the constant-width core. In this embodiment, the size of the pinions is not rigidly restricted as in the uninverted engine. They must be of sufficient radius to support teeth approximating the size of the teeth in the power band, but small enough to avoid collision with the core tunnel that connects the stator core to the vehicle or to another stator in a multi-cylinder engine.

In the embodiment of the inverted engine illustrated in FIG. 1, the pinions (and their supports) have been placed in the interior of the power band to leave the outside circumference unencumbered by any engine parts, so that the engine may drive a circumferential load (specifically a load that is radially symmetrical about the engine). The obvious circumferential load is an automobile tire, perhaps with some intervening clutch mechanism. Such a clutching mechanism would be similar to a conventional drum brake mechanism, except that it would clamp the wheel to a rotating object rather than a stationary one.

If the engine is used in the middle of a vehicle wheel, it is also desirable to have some "multi-speed" transmission between the engine and the outer wheel, if the wheel is not to be restricted to the same speed as the engine. The freewheeling pinions may be extended beyond the end of the power band, to provide additional points for drawing power from the engine. In the illustrated engine, a reversing band may run inside of the support pinions. Such a reversing band could also be extended out of the end of the power band and (once outside) increased in radius to provide two counter-rotating bands of the same diameter. (Note that the reversed band would not be traveling at the same velocity as the forward power band.) This is useful for a transmission designer that wants to provide forward and reverse gears.

The engine easily adapted to be the core of a planetary gear arrangement. An alternative embodiment has the power band supports revolving with the power band around the core tunnel on bearings. The revolving supports would carry planetary gears that engage a central gear fixed about the circumference of the core tunnel and extending beyond the radius of the power band. The outer wheel could then be coupled either to a ring gear encircling the planetary gears, directly to the power band, or to the axles of the planetary gears, providing three speeds for the circumferential load. This, however, is not strictly part of the engine, and the details are left to the designer of the circumferential load.

The rotating epitrochoidal combustion chamber revolves about a constant-width stator core that is supported by a tunnel extending from the inboard and outboard sides of the constant-width stator core along a common axis. Like the uninverted Wankel engine, shaft seals are required in the sides of the rotating combustion chamber to allow the chamber to revolve eccentrically about the core tunnel that supports the stator core. There are actually two circular seals involved: one interfacing to the epitrochoid chamber, the other sealing around the core tunnel. The maximum diameter of the outer seal is the minimum width of the epitrochoid, LT or LMINOR. This must be diminished slightly to allow for the radial thickness of the outer seal. The theoretical maximum outer diameter of the core tunnel is the width of the epitrochoid diminished by the amount of eccentricity, or LT-EO. The inside diameter may be somewhat arbitrary, but must allow the walls of the core tunnel to be strong enough to support a portion of the mass of a vehicle. Like the Wankel engine, the combustion chamber seal is necessary to allow the chamber to withstand pressure. Unlike the Wankel engine, no mechanical energy needs to be transmitted through the chamber seal. One side effect of the external-pinion geometry is that the eccentric and pinion gears are not within the combustion chamber, where they would be exposed to high temperatures and its accompanying thermal fatigue. Ideally, the chamber seal on an inverted rotary engine will be strong enough that the seals may constrain the revolution of the chamber without the additional constraint of the power band and its pinions. This may allow the engine to operate with the power band removed during service.

In both standard and inverted rotary engines with a triangular constant-width rotor or stator, three complete sets of four cycles each occur for each rotation of the rotor within or about the stator. In both engines, a volume of gas confined in a sub-chamber between the stator and rotor walls will at some time be in contact with the entire perimeter of the enclosing chamber, but will be in contact with only one side of the enclosed rotor or stator. In the standard (uninverted) engine, where the intake and exhaust valves are associated with the enclosing chamber, it is only necessary to have a single intake valve, spark plug and exhaust valve that service each of the succeeding sub-chambers as they visit the portion of the enclosing chamber associated with the intake, ignition and exhaust cycles. When the engine is inverted and the valves become associated with the constant-width core, it becomes necessary to have a set of valves and a spark plug associated with each face of the core, because a volume of gas is associated with the face of the core through which it enters the combustion chamber, and it remains governed by that face of the core until it is later exhausted from the chamber. Although the intake valves all share a common actuating cam, the number of valves required increases linearly with the number of faces of the constant-width core, suggesting that the number of sides in the stator core should be minimized. The tradeoff here is that the individual valves have at most one-third of the duty cycle of their counterparts in the standard engine. In the inverted engine, a spark plug or valve failure may allow the engine to continue to "run on two-thirds of a rotor", with the power output compromised accordingly.

The inverted rotary engine shown in FIGS. 1-6 is a single-rotor engine with an axial engine mount. This type of mount is intended to bolt onto the side of a vehicle, for an engine-per-wheel application. FIG. 7 illustrates a 3-rotor engine with radial engine mounts. To allow the radial mounts to be placed between the rotor stages, the power band is split at each engine mount. A set of pairs of transfer pinions support the power bands and transfer their power through the engine mounts. This engine configuration is intended to span the width of the vehicle, perhaps occupying rear wheel location with a pair of unpowered steering wheels at the front of the vehicle. In this arrangement, a wheel might be mounted on each of the outboard power bands, with the power of the middle rotor being transmitted to the outboard power bands through the transfer pinions which are rigidly fixed to their respective transfer shafts.

In the multi-rotor engine, the three rotors (and their associated cam wheels on the cam shaft) differ in phase by 120 degrees. This amount of phase difference is needed if the different segments of the power band are to be synchronized through the transfer gears. When an epitrochoid is orbiting about a constant-width solid, the velocity of the eccentric gear varies three times per revolution in a sinusoidal manner. Therefore, all linked rotors should be in the same orientation with the faces or vertices of the constant-width solid. For this reason, the optimal number of rotors in a multi-rotor engine will be a multiple of the number of "sides" of the constant-width solid. With the rotors offset from each other by 120 degrees, the center of mass of the three-rotor engine is always coincident with the center of the stator core. By contrast, the center of mass of a single-rotor engine is never coincident with the center of the stator.

There are embodiments of the inverted engine that may operate with no power band. Such an engine is useful when a circumferential load that is tolerant of the eccentricity of the rotors in the absence of a power band. By placing a set of propeller blades around each of three rotors that are 120 degrees out of phase with each other, the dynamic effect of the eccentric motion of any one set of blades is cancelled out by the effects of the remaining two sets of blades, and the set of propellers collectively behave dynamically as a single set of non-eccentric blades. In this manner, the inverted engine has nautical and aeronautical applications. When a multi-rotor inverted engine is operated without a power band, the rotors may be synchronized with each other and with the cam shaft through a linkage between the shaft seals of adjacent rotors.

There are parts essential to the starting and operation of the engine that are not illustrated here. A starter and a generator may easily be mounted on one or the other pinion support, with an abundance of exposed teeth on the interior of the power band to engage the starter or generator gears. Alternatively, a multi-pole generator may be placed in the core tunnel, with permanent magnets orbiting about it. An epitrochoid pump chamber may revolve about the engine core along with the combustion chamber, driven by the power band. Such pump chambers and their associated constant-width pump cores could serve to pressurize fuel, oil hydraulic or cooling fluids. There is ample space in the core tunnel for intake and exhaust manifolds. The air filter may be integrated into the hubcap.

Inverted Rotary Engine Dynamics and Vehicle Design

The existence of an engine that is suitable as the core of a transmission or a vehicle wheel has interesting implications for vehicle design. The mass of the engine is no longer supported by the vehicle's frame. Instead, the mass of the vehicle's frame is supported by the engine. The mass of the engine is now centered directly over the point of road contact, favoring improved traction. The mass of what used to be the crankcase and the transmission linkage now effectively becomes part of the mass of the flywheel. Shortening the transmission distance from the engine to the road contact points is in the interest of reducing the vehicle mass, and reducing the number of components and interfaces in the transmission path is in the interest of reducing frictional power losses. Energy conservation demands the investigation of this class of engines. Once the engine has been placed in the middle of the wheel, the only ways to further shorten the transmission distance between the point of combustion and the point of road contact is to make the engine smaller, or devise encompassing transmission arrangements with shorter force paths. In the application of inverted engines, the interface between the engine and the encircling transmission becomes indistinct, with some components being both engine and transmission parts. There are abundant ways of obtaining mechanical power from the engine, because most of the exposed surface of the engine (other than the mounts and pinion supports) are in some kind of rotary motion.

Although a number of exemplary aspects and embodiments have been discussed above, those of skill in the art will recognize that there can be modifications, permutations, additions and sub-combinations thereof. It is therefore intended that the following appended claims and claims hereafter introduced are interpreted to include all such modifications, permutations, additions and sub-combinations as are within their true spirit and scope.

Comparison of Standard and Inverted Engines.

In any rotary internal combustion engine, there is a rotor and a stator that both receive the reaction force from the explosive combustion of fuel. The stator is the part of the engine that responds to the reaction force by resisting change in position. The rotor is the part of the engine that responds to the reaction force by accepting change in position, and does so by rotating.

In the classical rotary combustion engine, the function of the stator is assigned to a chamber of epitrochoid shape while the function of the rotor is assigned to a shape of constant-width geometry (i.e., a Reuleaux triangle) that revolves within the epitrochoid chamber. In the inverted rotary engine, the function of the stator is assigned to a form of constant-width geometry that resides at the core of the engine, and the function of the rotor is assigned to an epitrochoid chamber that revolves around the stator.

In all rotary internal combustion engines, there exists a constraint mechanism that restricts the motion of the rotor in relation to the stator so that changes in their relative position may result in the four cycles of fuel intake, fuel compression, power generation and exhaust vacation. In the classical rotary engine, this constraint is imposed by a pinion that is fixed in relation to the stator penetrating through the rotor that is enclosed within the stator. In the inverted rotary engine, this constraint is imposed either by an encompassing band that is restricted (perhaps by supporting external pinions) to revolving around the central axis of the stator core, or by the revolving seals in the sides of the chambers.

In almost all internal combustion engines, the functions of fuel injection, ignition spark provision and exhaust evacuation are associated with the stator, and there is a mechanism to synchronize these operations with the rotation of the rotor. In the classical rotary combustion engine, the valves and spark plugs project externally from a stator that encloses a rotor. In the inverted rotary combustion engine, the valves and spark plugs project internally into a stator that is enclosed by a rotor. In both the classical and inverted rotary engines, the synchronization mechanism must accommodate the obstacle imposed by the rotor and the valves being on opposite sides of the wall of the stator.

These three points constitute the essential distinction between the standard and inverted rotary internal combustion engines. These distinctions lead directly to the set of claims about inverted rotary internal combustion engines.

The invention claimed is:

1. An internal combustion engine comprising:
   (a) a support structure, including a tube;
   (b) a hollow stator core with multiple curved surfaces, supported by and rigidly affixed to said tube;
   (c) a rotor assembly defining an interior space that is subdivided by the stator, eccentrically and rotatably mounted about said stator core and having a pair of partial sidewalls, each defining a circular opening;
   (d) a pair of shaft seals each set into a said circular opening and rotatably mounted about said tube;
   (e) said stator core, rotor and shaft seals together defining multiple, separate sealed chambers that change volume as said rotor moves;
   (f) ignition, intake and exhaust mechanisms mounted internal to said hollow stator core.

2. The engine of claim 1 in which a ring gear is mounted about and driven by said rotor and constrained by a positional constraint assembly.

3. The engine of claim 1, in which the outer perimeter of the ring gear is unencumbered by the engine mechanism and may be used to drive a circumferential load.

4. The engine of claim 1, in which said ignition, intake and exhaust mechanisms are driven by a set of cams mounted on a cam shaft.

5. The engine of claim 1 in which a cog wheel is mounted on said shaft seal and said cog wheel drives a gear train that drives said cam shaft.

6. The engine of claim 1, in which all of said multiple chambers serve as combustion chambers.

7. The engine of claim 2, in which said constraint mechanism is a set of pinions rotatably mounted so as to engage and constrain said ring gear.

8. The engine of claim 2 in which said rotor has outwardly facing teeth on its radially exterior surface and said ring gear has inwardly facing teeth on its radially inward surface and wherein said inwardly facing teeth mesh with said outwardly facing teeth.

9. An internal combustion engine comprising:
   (a) support structure means, including tube means;
   (b) stator core means core with multiple curved surfaces, supported by and rigidly affixed to said tube means;
   (c) rotor assembly defining an interior space that is subdivided by the stator, eccentrically and rotatably mounted about said stator core means and having a pair of partial sidewall means, defining a circular opening;
   (d) a pair of shaft seal means each set into a said circular opening and rotatably mounted about said tube means;
   (e) said stator core means, rotor means and shaft seal means together defining multiple chambers that change volume as said rotor means moves, at least one of said chambers being a combustion chamber; and
   (f) ignition, intake and exhaust means mounted internal to said hollow stator core means.

10. The engine of claim 9 in which ring gear means are mounted about and driven by said rotor means and constrained by positional constraint means.

11. The engine of claim 10 in which said rotor means has outwardly facing teeth means on its radially exterior surface and said ring gear has inwardly facing teeth means on its radially inward surface and wherein said inwardly facing teeth means mesh with said outwardly facing teeth means, to drive said ring gear.

12. The engine of claim 10, in which an outer perimeter of said ring gear means is unencumbered by said engine and may be used to drive a circumferential load.

13. The engine of claim 9, in which said ignition, intake and exhaust mechanisms are driven by a set of cam means mounted on a cam shaft means.

14. The engine of claim 9, in which gear means are mounted on said shaft seal and said gear means drive a gear train means that drives said cam shaft means.

15. The engine of claim 9, in which all of said multiple chambers are combustion chambers.

16. The engine of claim 10, in which said constraint means is a set of pinion means rotatably mounted so as to engage and constrain said ring gear means.

* * * * *